W. M. McCAIN.
SHEET FEEDING MACHINE.
APPLICATION FILED SEPT. 28, 1917.

1,297,707.

Patented Mar. 18, 1919.
9 SHEETS—SHEET 1.

Inventor
William M. McCain
by J. H. Ferguson
Attorney

W. M. McCAIN.
SHEET FEEDING MACHINE.
APPLICATION FILED SEPT. 28, 1917.

1,297,707.

Patented Mar. 18, 1919.
9 SHEETS—SHEET 2.

Inventor
William M. McCain
By J. H. Ferguson
Attorney

W. M. McCAIN.
SHEET FEEDING MACHINE.
APPLICATION FILED SEPT. 28, 1917.

1,297,707.

Patented Mar. 18, 1919.
9 SHEETS—SHEET 5.

Inventor
William M. McCain
By J. H. Ferguson
Attorney

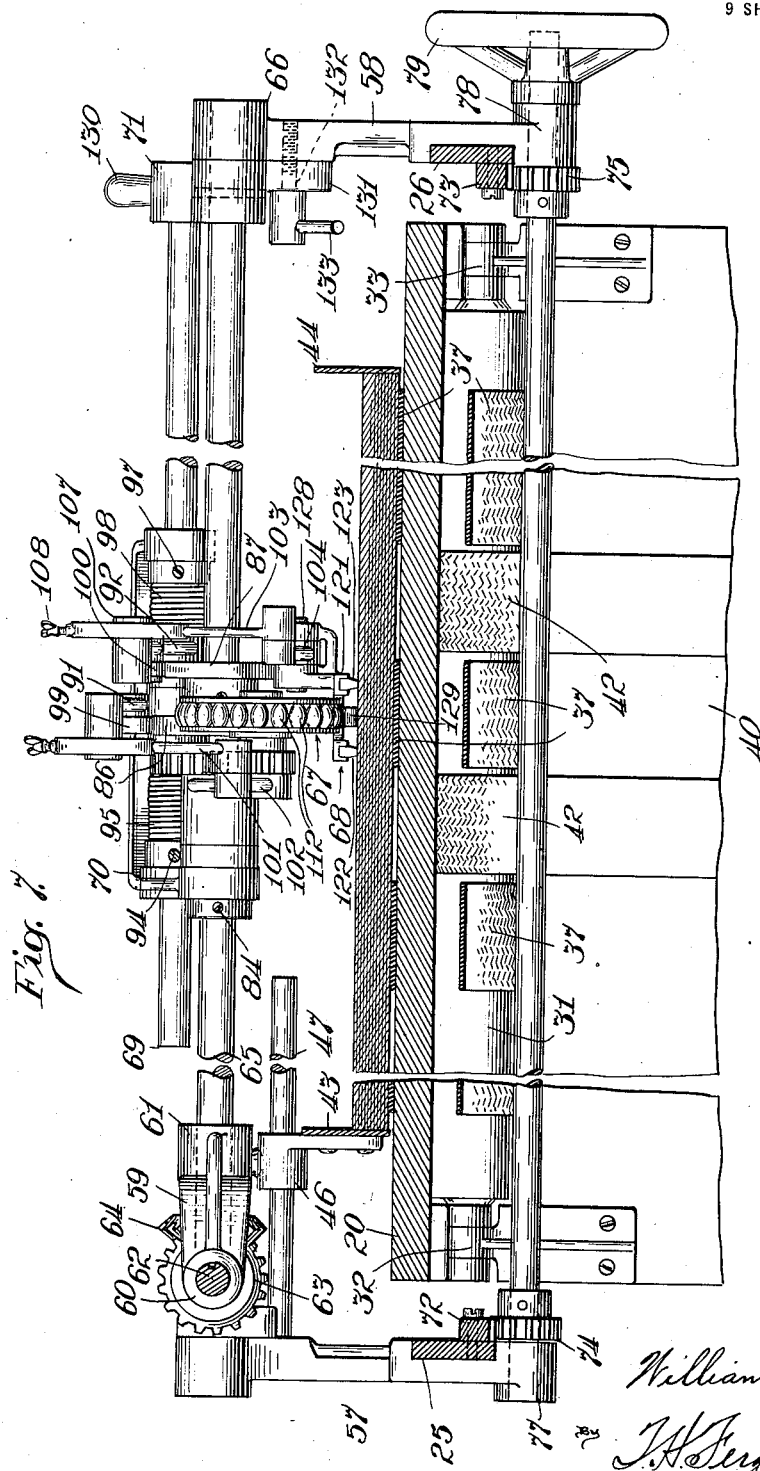

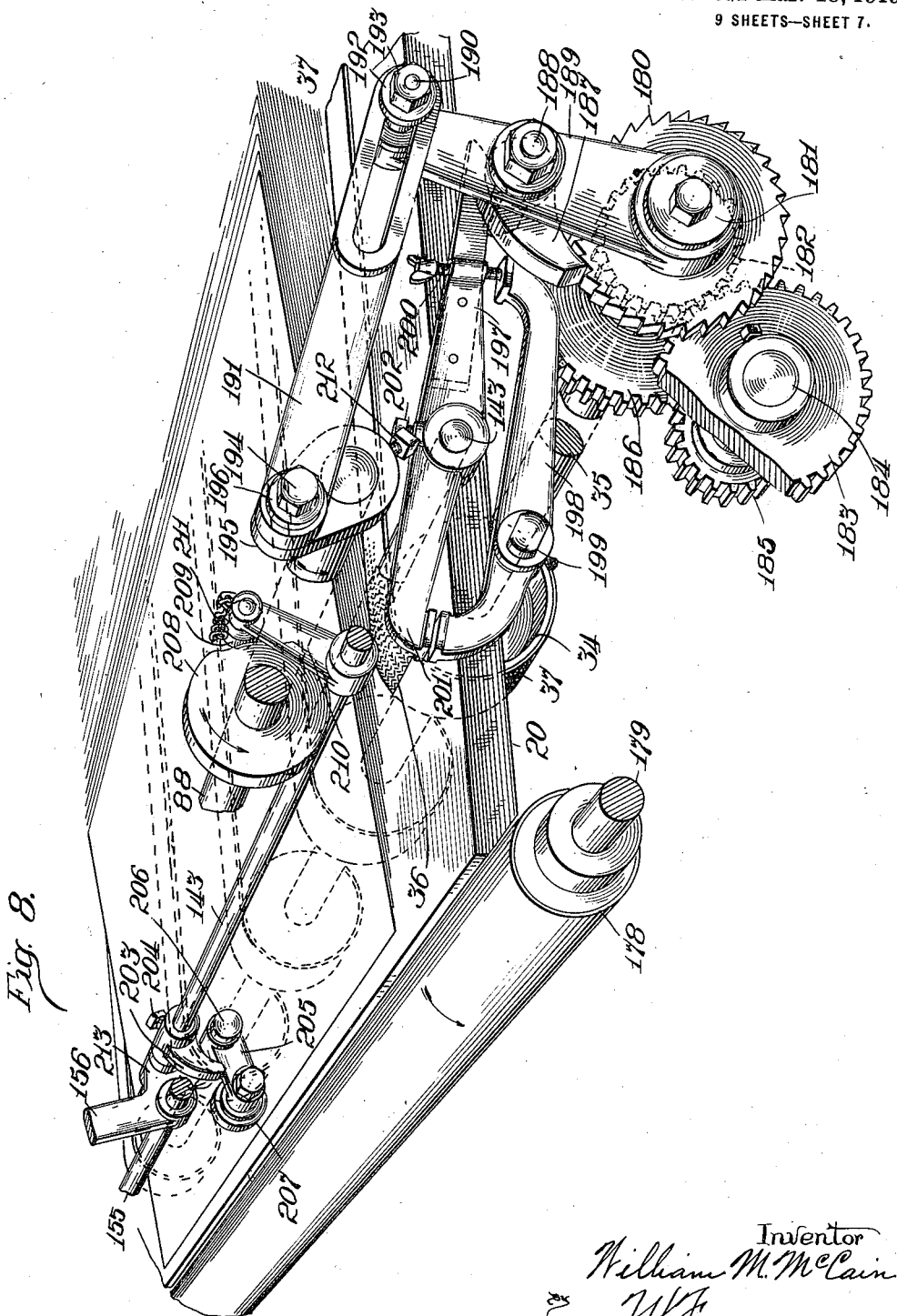

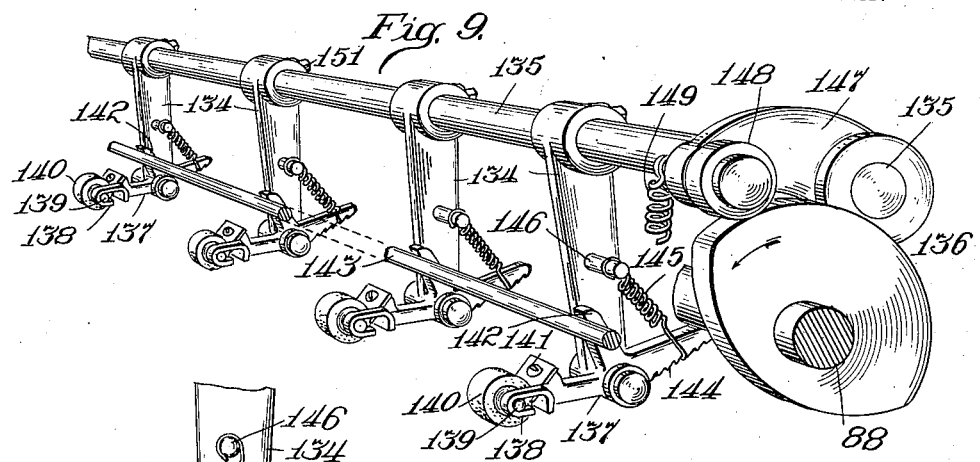
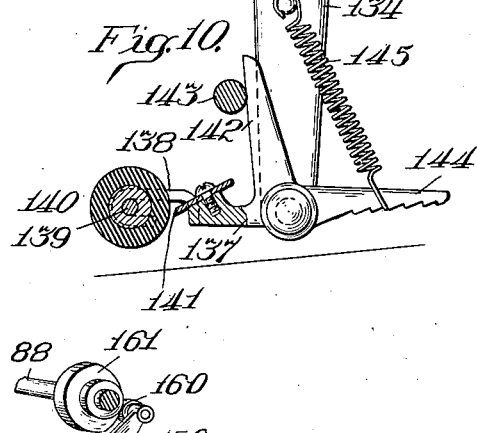
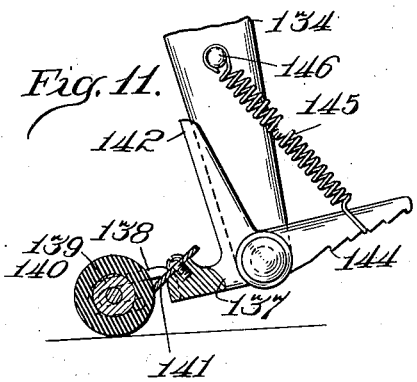
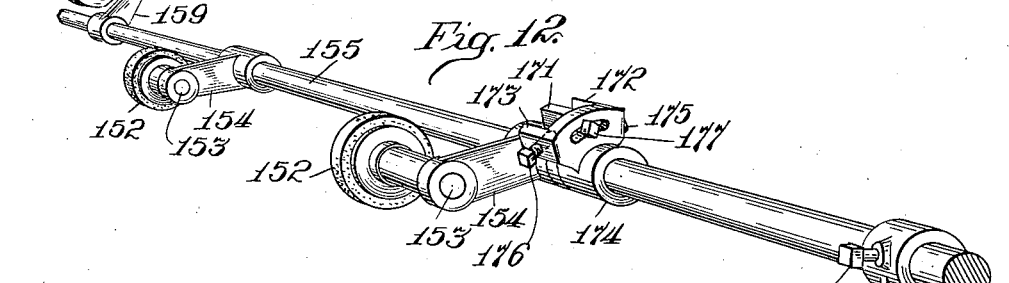
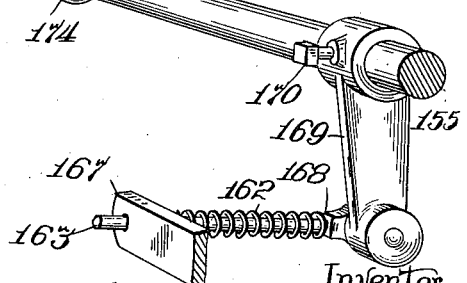

W. M. McCAIN.
SHEET FEEDING MACHINE.
APPLICATION FILED SEPT. 28, 1917.
1,297,707.
Patented Mar. 18, 1919.
9 SHEETS—SHEET 9.
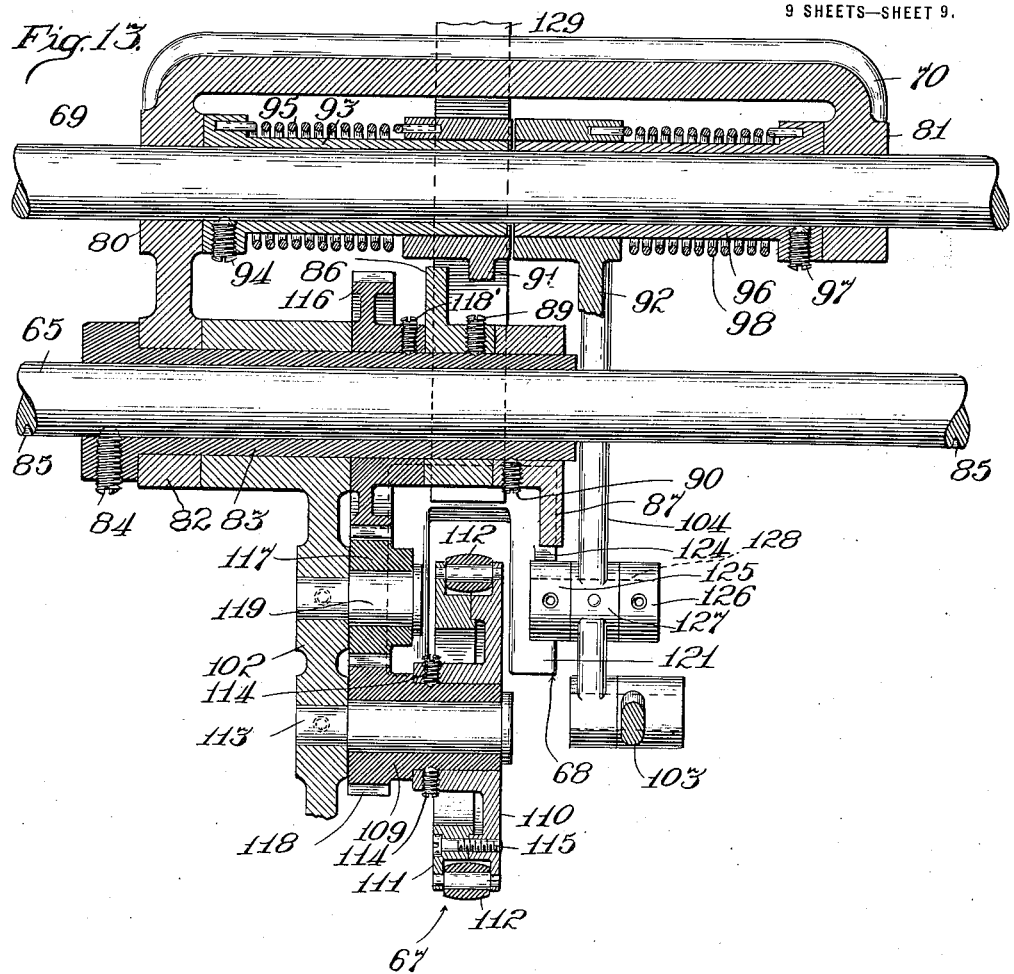
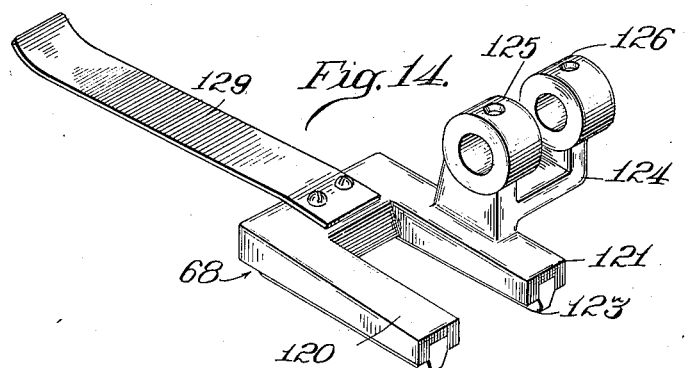
Inventor
William M. McCain
J. H. Ferguson
Attorney

UNITED STATES PATENT OFFICE.

WILLIAM M. McCAIN, OF CHICAGO, ILLINOIS.

SHEET-FEEDING MACHINE.

1,297,707.  Specification of Letters Patent.  Patented Mar. 18, 1919.

Application filed September 28, 1917. Serial No. 193,669.

*To all whom it may concern:*

Be it known that I, WILLIAM M. McCAIN, a citizen of the United States, residing at Chicago, county of Cook, State of Illinois, have invented certain new and useful Improvements in Sheet-Feeding Machines, of which the following is a specification.

The present invention relates generally to sheet feeding machines and more particularly to that class of sheet feeding machines in which the sheets lie in a feathered bank on the feeding table and are still further feathered or combed out by a combing wheel and then fed, sheet by sheet, from the machine.

The principal object of the invention is to provide a machine of this type which shall have a high speed of delivery and at the same time be simple and economical in construction. This general object includes the more specific objects of improving (1) the mechanism for combing, feeding and holding the sheets, (2) the mounting of the combing wheel and retarding or holding foot to permit their ready lateral adjustment above the feed table while maintaining a suitable driving connection, and (3) other details and parts, as will more fully appear upon consideration of the following detailed description of the preferred embodiment of the invention taken in connection with the accompanying drawing illustrating the same. The invention itself will be particularly pointed out in the appended claims.

Figure 1:
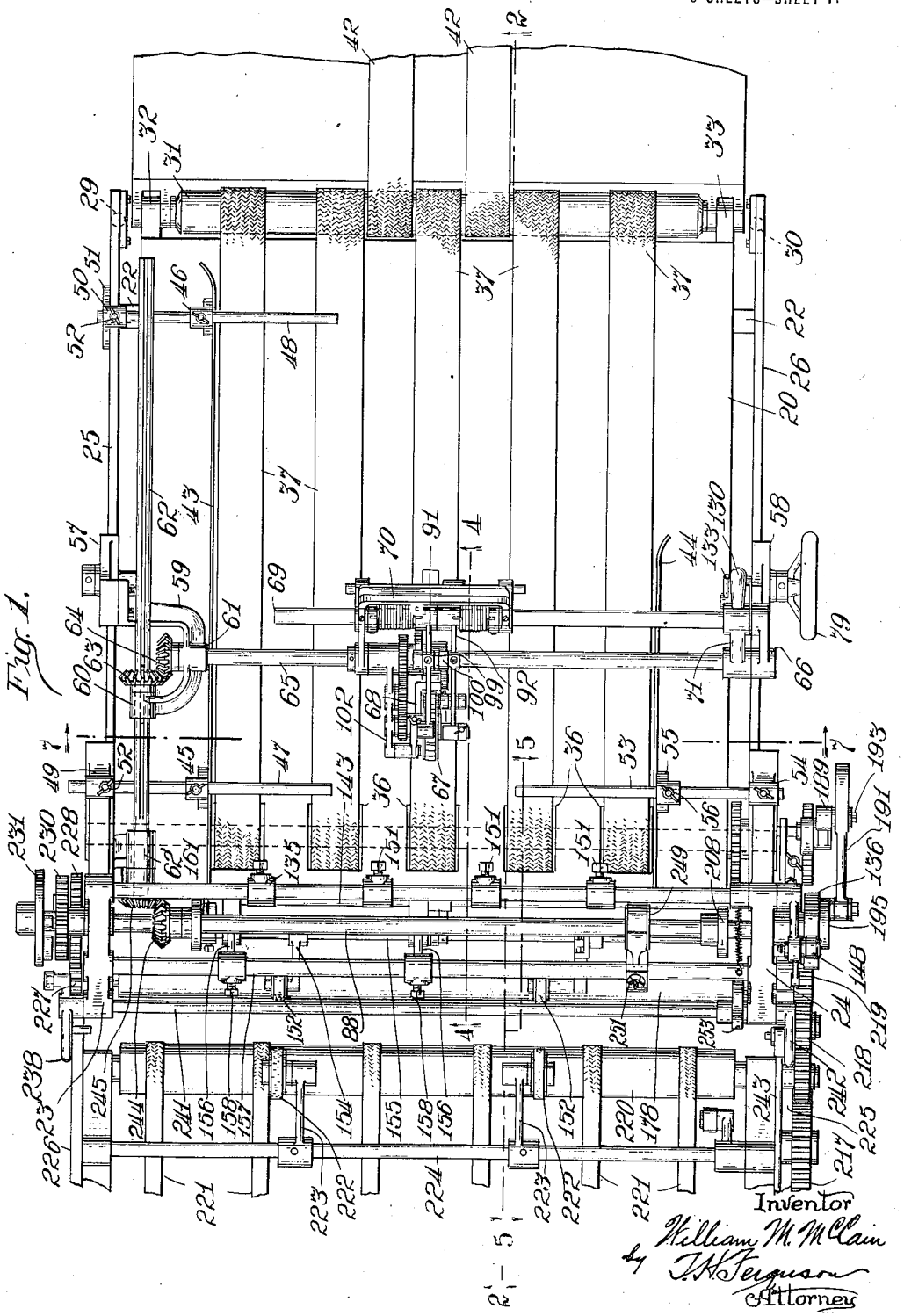
Figure 2:
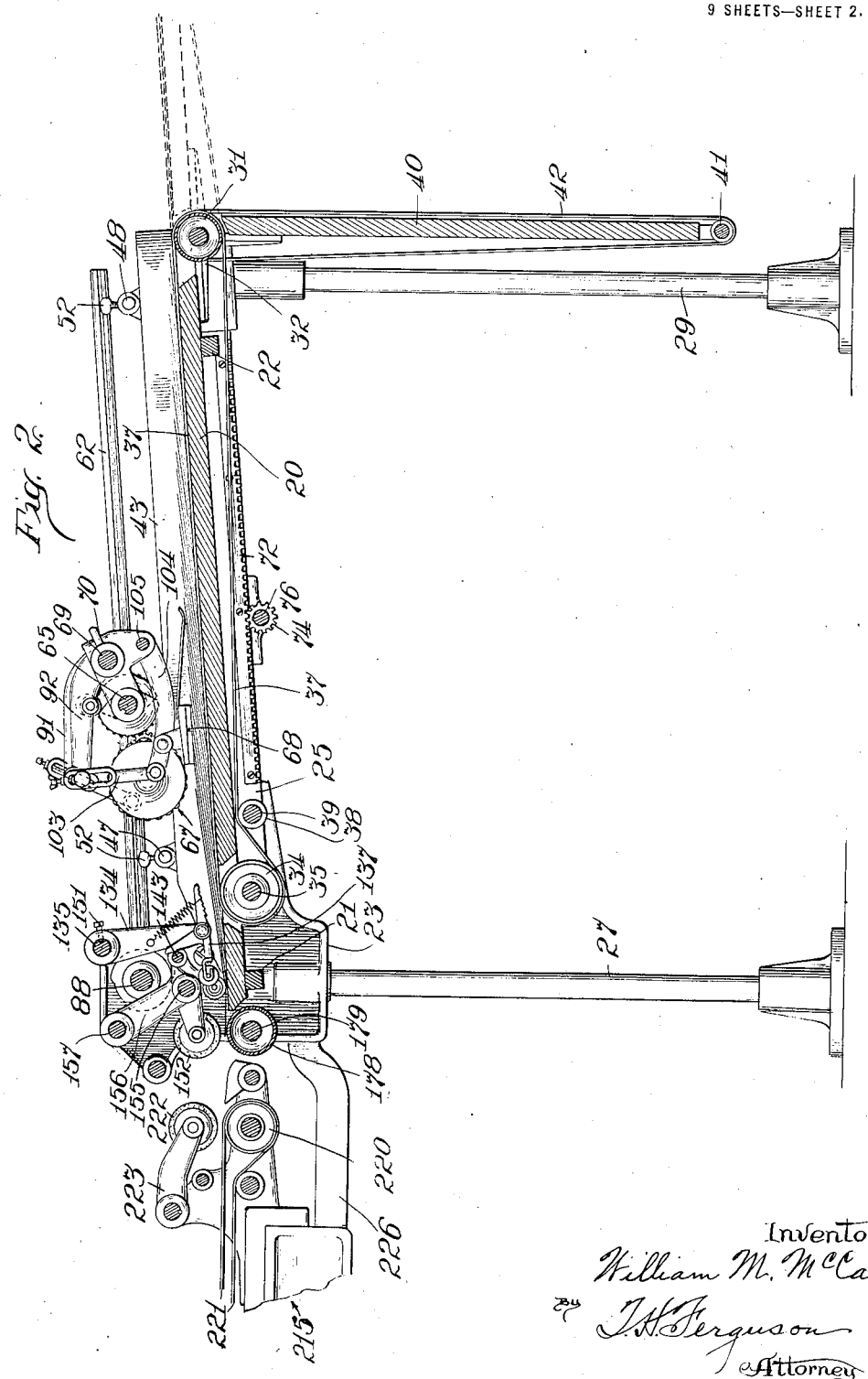
Figure 3:
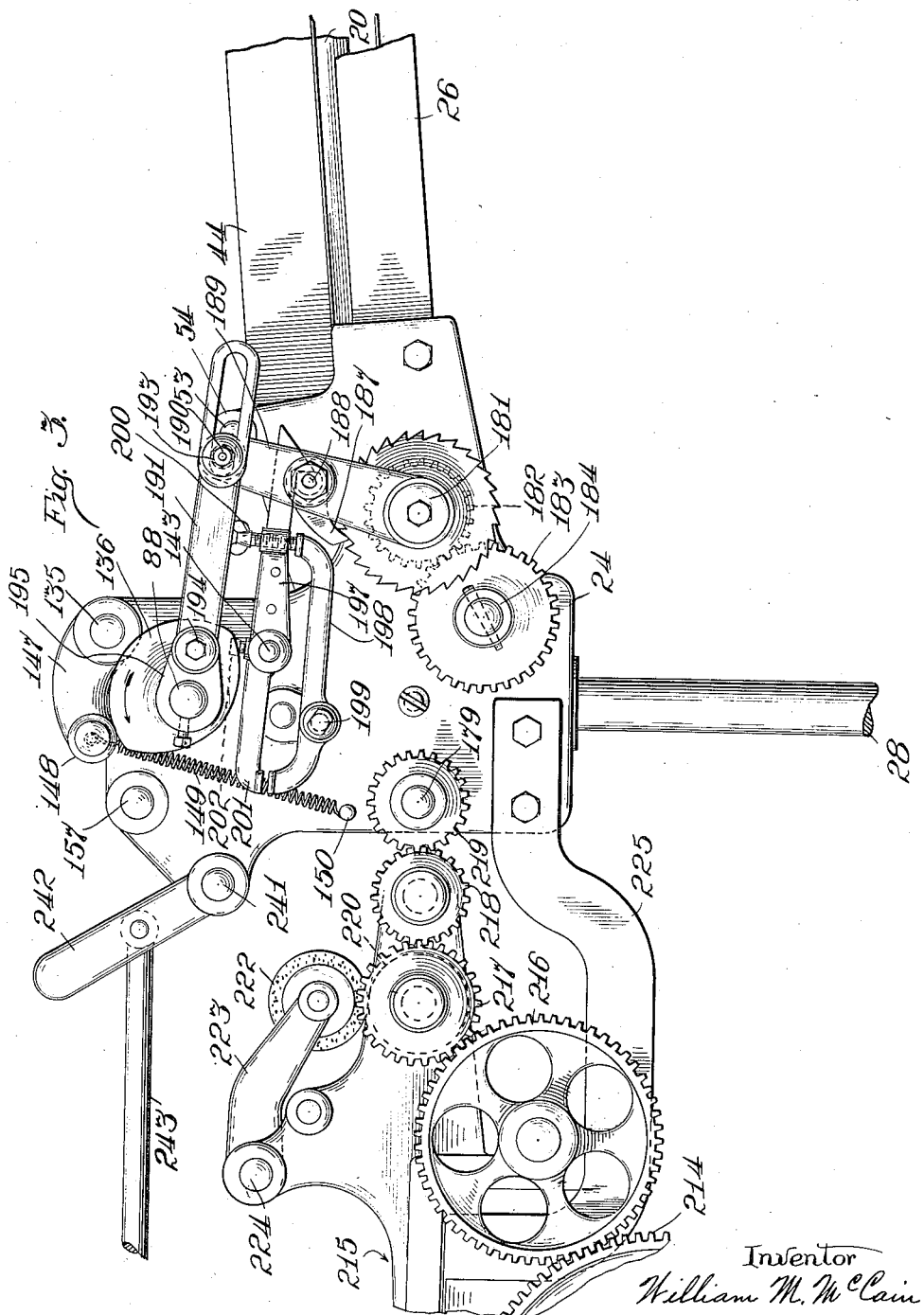
Figure 4:
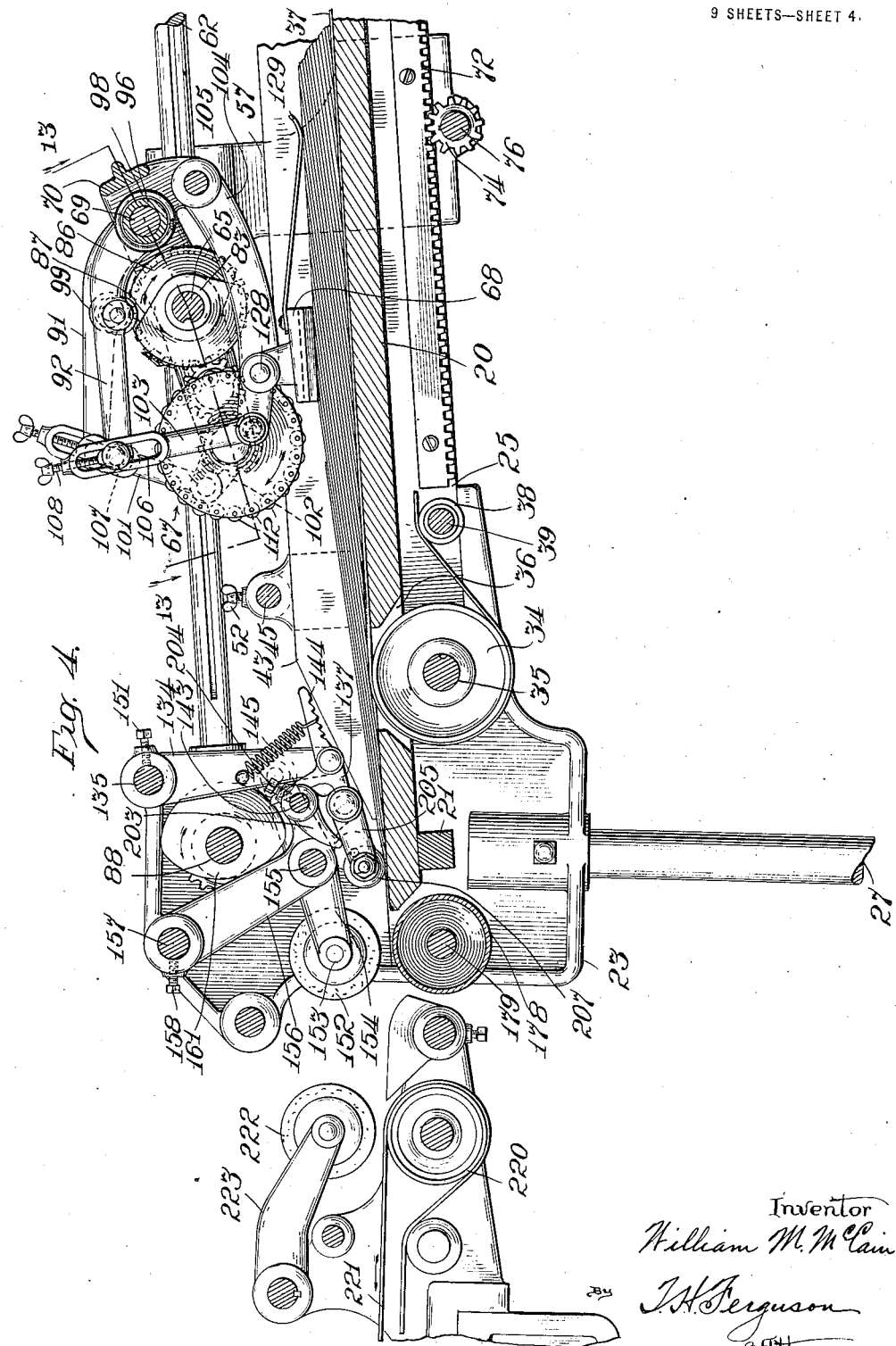
Figure 5:
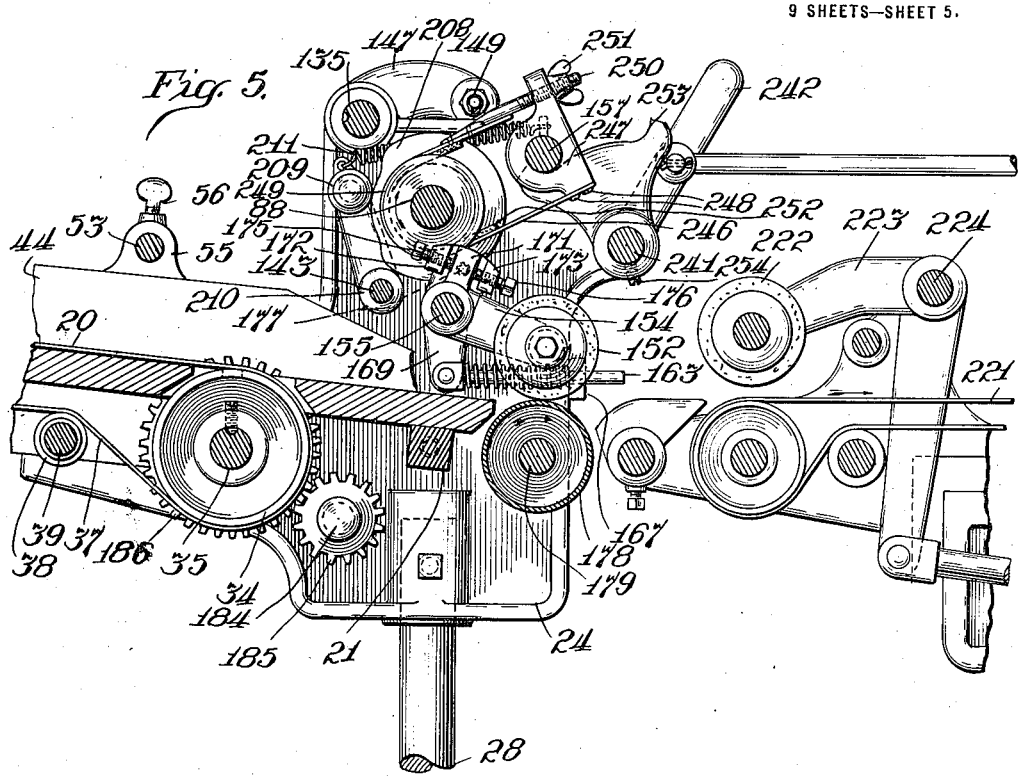
Figure 6:
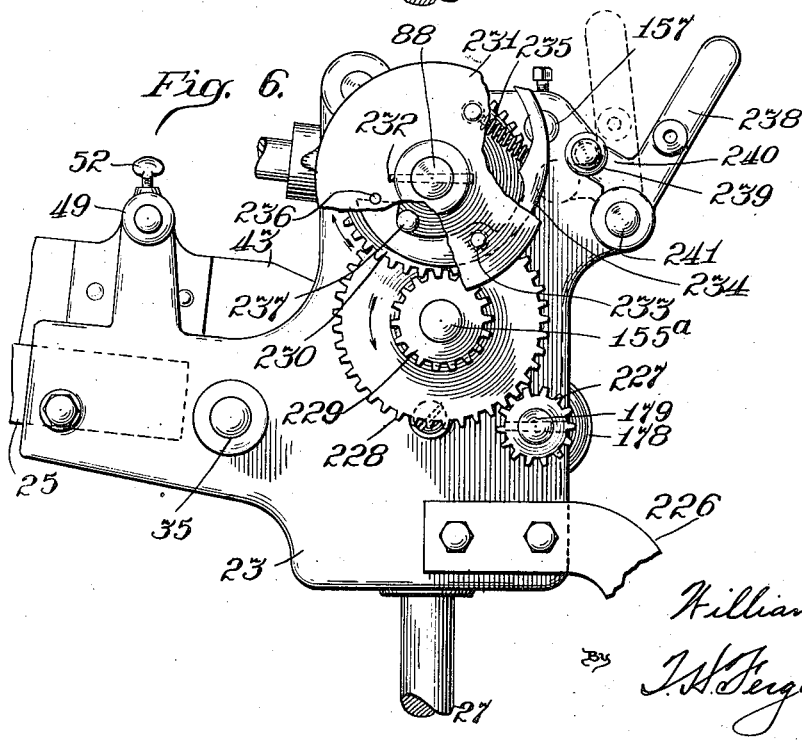

In the drawing, which includes nine sheets, Figure 1 is a plan view of a sheet feeding machine constructed in accordance with the present invention and associated with a folding machine to which the sheets are to be delivered; Fig. 2 is a sectional elevation of the same, the section being taken on a plane indicated by the line 2—2 of Fig. 1; Fig. 3 is a side elevation of portions of the feeding machine and folder, illustrating the gearing by which the former is driven from the latter; Fig. 4 is a somewhat enlarged sectional elevation, the plane of section being indicated by the line 4—4 of Fig. 1; Fig. 5 is a similar sectional elevation, the plane of section being indicated by the line 5—5 of Fig. 1; Fig. 6 is a side elevation of a portion of the feeding machine, illustrating particularly the gearing and clutch at the opposite side of the machine from that illustrated in Fig. 3; Fig. 7 is a transverse sectional elevation, the plane of section being indicated by the line 7—7 of Fig. 1; Fig. 8 is a perspective view of a portion of the feed table and associated governing and feeding mechanism by which the entire bank of sheets is moved forward intermittently, some of the parts being shown broken away and others positioned so as to more clearly illustrate their respective functions; Fig. 9 is a similar perspective view of the individual sheet-advancing members and their actuating cam. Fig. 10 is a detail view of one of these sheet-advancing members, showing the parts at the time the same have reached the end of their forward stroke, so as to lift the roll from the paper; Fig. 11 is a similar view illustrating the parts at the time the member has reached the end of its return stroke and is about to begin its advance stroke; Fig. 12 is a view similar to Fig. 9, illustrating the drop rolls and associated parts which come into play in finally delivering the sheet from the feeding machine; Fig. 13 is a detail view of the retarding foot, combing wheel, combing wheel frame and other associated parts, most of said parts being illustrated in section, taken on a plane indicated by the line 13—13 of Fig. 4; and Fig. 14 is a perspective view of the retarding or clamping foot which rests upon the bank of sheets and coöperates with the combing wheel.

Throughout these views, like characters refer to like parts.

Referring to the drawing in detail, it will be seen that the feed table 20 rests upon transverse bars 21, 22, which extend respectively between the side frame castings 23, 24 and the side bars 25, 26. The side frame castings 23 and 24 are supported by legs or standards 27 and 28, respectively. Similarly the ends of the side bars 25 and 26 adjacent to the cross bar 22 are supported upon standards or legs 29, 30. The table 20 has a tape roller 31 journaled in bearings 32 and 33 at its receiving end and tape rollers 34 mounted upon a shaft 35 located near its delivery end. The table is provided with openings 36 into which the tape rollers 34 extend. Suitable conveying tapes 37 pass over the rollers 34 and the common roller 31. The upper stretch of each tape lies close to the table 20, as clearly illustrated. The under stretch extends in each instance over a guide roll 38 mounted on a shaft 39 located close to the under side of the table 20 and adjacent to the tape pulleys 34. In this way the tapes are kept close to the under side of the table. The table 20 is provided with an extension table 40 located at its receiving end and journaled upon the shaft of the tape roller 31. At the outer end of the extension table 40 are a pair of tape rollers 41, and a pair of tapes 42 extend over the roller 31 and these rollers 41, the upper stretch of the tape lying close to the upper surface of the table extension 40. This extension may be dropped down into the position illustrated in full lines in Fig. 2, or raised up so as to lie in line with the table 20, as indicated by the dotted lines in Fig. 2. The tapes 37 are driven from shaft 35 and in turn rotate roller 31, which drives the tapes 42. In practice a bank of sheets of paper is placed up the feeding table 20 and its extension 40 directly upon the tapes 37 and 42. Of course it may not be necessary to use the extension 40 in some cases. In such instances the bank would rest only upon table 20 and tapes 37. The bank of sheets is feathered out by hand when placed upon the table. When a new bank is added, the foremost sheet is placed under the last sheet of the previous bank and so a continuous feathered bank is provided upon the table of the machine. Guides 43 and 44 are located upon the table 20 for the purpose of holding the bank of sheets in proper relation to the other parts of the machine. These guides consist of vertical plates which are flared at their ends so as to more readily guide the sheets into position. The guide 43 is provided with a pair of supporting members 45, 46. Each of these members is provided with a plate to which the guide is secured, and with a boss which is provided with an opening. In the case of guide 43, a rod or shaft 47 extends through this opening, and in the case of member 46, a similar rod 48 extends through the opening. The rod 47 extends through a boss 49 upon the side frame casting 23. Similarly the rod 48 extends through a boss 50 forming part of a casting 51 secured to the side bar 25. Each of these bosses is provided with a thumb screw 52, which serves to hold its associated boss and shaft in fixed relation. By means of this construction, the guide 43 may be shifted back and forth transversely of the table 20 to any desired position. The guide 44 is shorter than the guide 43, for the purpose of allowing the operator who stands near the side bar 26, to place the banks of paper in proper position on the table. In this instance the guide is provided with but a single supporting rod. This rod, which is designated 53, extends through a boss 54 upon the side frame casting 24, and through a boss upon the guide supporting member 55. Thumb screws 56 serve to set the rod 53 and to adjust the guide 44 transversely of the table 20.

The side bars 25 and 26 carry respectively the side frames 57 and 58. The frame 57 is provided with a yoke 59 in which are provided bearings 60 and 61. A shaft 62 extends through the bearing 60 and through an additional bearing 62' secured to the upper side of the table 20. The shaft 62 lies adjacent to one edge of the table 20 and extends longitudinally thereof. A beveled gear wheel 63 is splined to the shaft and by reason of the longitudinal groove in the shaft may be readily moved longitudinally with the yoke 59 to any adjusted position and in any such position will rotate with the shaft 62. The beveled gear wheel 63 meshes with a coöperating beveled gear wheel 64 secured to the end of a transverse shaft 65 which is journaled at one end in the bearing 61 of yoke 59, and at the other end in a bearing 66 in the side frame 58. The shaft 65 is employed for the actuation of the combing wheel 67 and retarding foot 68, both of which act upon the bank of paper upon the table 20. The shaft 65 also coöperates with shaft 69 to support the frame 70 and other parts associated with the combing wheel 67 and foot 68. The shaft 69 is fixed to an arm 71 and preferably extends through an opening in a boss on said arm. The arm 71 lies adjacent to the side frame 58 and is loosely mounted upon the shaft 65 adjacent to the boss 66. The side frames 57 and 58, together with the shafts 65 and 69 and other connected parts, may be adjusted longitudinally of the table 20 by sliding the side frames 57 and 58 back and forth upon the side bars 25 and 26. For the purpose of bringing about this adjustment, side bar 25 is provided with a rack 72, and the side bar 26 is provided with a rack 73. The racks 72 and 73 coöperate with pinions 74 and 75, respectively, located upon the transverse shaft 76 which is journaled at its ends in bearings 77 and 78 in the side frames 57 and 58, respectively. The hand wheel 79 is secured to the end of the shaft 76 upon the operator's side of the machine. By turning this hand wheel, the pinions 74 and 75 are rotated and, by reason of their engagement with the teeth of the racks 72 and 73, the entire structure supported by the side frames 57 and 58 is moved bodily lengthwise of the table 20.

The frame 70 and the parts carried by it are more particularly illustrated in Fig. 13. As there shown, this frame is irregular in shape, having two bosses 80 and 81, through which the shaft 69 passes, and a boss 82 through which a headed sleeve 83 passes. The latter in turn is positioned upon the rotatable shaft 65. The sleeve 83 is secured to the shaft 65 by means of a set screw 84, which is threaded through an opening in the head of the sleeve and engages at its inner end in a groove 85 which extends throughout practically the entire length of the shaft 65. By this construction the sleeve may be moved longitudinally of the shaft to any desired position and then by screwing home the set screw 84, it will be held in adjusted position and will be secured to the shaft so as to rotate with it. Since the sleeve 83 carries cams 86 and 87 which are to bear a definite timed relation with other cams of the machine, as for example those upon shaft 88, it will be seen that the setting of the set screw 84 into groove 85 will always maintain the proper timed relation between the cams on the different shafts. The cam 86 is secured to the sleeve 83 by means of a set screw 89. Similarly cam 87 is secured to sleeve 83 by a set screw 90. The cam 86 is employed to raise and lower the combing wheel lifting arm 91, and the cam 87 is similarly employed to raise and lower the lifting arm 92 associated with the retarding foot 68. The arm 91 is yieldingly journaled upon the headed sleeve 93, which in turn is positioned upon shaft 69 and fixed thereto in any desired adjusting position by means of a set screw 94. A coiled spring 95 surrounds the sleeve 93 and is secured at one end to the head of the sleeve and at the other end to the boss of arm 91, as clearly illustrated in Fig. 13. Similarly lifting arm 92 is yieldingly journaled upon a sleeve 96, which in turn is positioned upon shaft 69 and secured thereto in any desired adjusted position by a set screw 67. A coiled spring 98 surrounding sleeve 96 is secured at one end to the head of the sleeve and at the other end to the boss on the arm 92, as clearly illustrated in the same figure. These springs serve to press the arms downward so as to bring a proper tension on the combing wheel and retarding foot, such tension being varied in accordance with the character of the paper being worked upon, by the proper setting of set screws 94 and 97. A cam roller 99 on arm 91, and a cam roller 100 on arm 92, coöperate with the cams 86 and 87, respectively. The outer end of arm 91 is adjustably secured to a link 101 which is pivoted at its outer end to the forward end of an arm 102 which carries the combing wheel 67 and is pivoted upon sleeve 83 on shaft 65. With this arrangement it will be seen that as shaft 65 is rotated, cam 86 will coöperate with spring 95 to raise and lower arm 91 and thereby, through the agency of link 101, raise and lower arm 102 and the associated combing wheel 67. Likewise arm 92 is adjustably secured at its outer end to the upper end of link 103, which is pivoted at its lower end to the forward end of arm 104, which carries retarding shoe 68 and is pivoted at its rear end upon a stud 105 upon a portion of frame 70. With these parts it will be seen that as shaft 65 rotates, cam 67 will coöperate with spring 98 to raise and lower arm 92 and the associated retarding foot 68. The adjustable connection between arm 91 and its link 102 is the same as the adjustable connection between arm 92 and link 103. It will therefore suffice to describe one of these connections. If we consider the connection between arm 92 and link 103, we see that the link is provided with a slot 106 into which extends a lateral projection 107 upon the outer end of arm 92. A screw 108 is threaded through the upper end of the link and extends into the slot 106 into engagement with the upper side of the projection 107. The weight of the parts will be sufficient to maintain the lower end of the screw and the projection in engagement at all times. By varying the position of the screw, the position of the projection 107 in the slot will be varied and consequently the effective length of the link 103 likewise varied.

The combing wheel, as illustrated more in detail in Fig. 13, comprises a hub 109, a web member 110, ring 111 and rollers 112. The hub 109 is mounted upon a stud shaft 113 which is secured to arm 102. The web 110 is secured to the hub 109 by means of set screws 114. The ring 111 and the web 110 are secured together by a series of screws 115. The peripheries of the web 110 and ring 111 are cut away so as to provide a space for the rollers 112, which are preferably composed of fiber. These rollers are loosely mounted on axles which are fixed at one end in the peripheral portion of the web 110 and supported loosely at the other end in ring 111, and the rollers extend beyond the latter so as to engage the paper when the machine is in operation. The combing wheel 67 is driven from shaft 65 by a train of gearing which, in the present instance, includes gear wheels 116, 117, and the gear teeth 118 on hub 109. The gear wheel 116 is fixed to sleeve 83 by a set screw 118'. Gear wheel 117, which meshes with wheel 116, is mounted on the stud shaft 119 which projects laterally from the arm 102. The teeth 118 on hub 109 mesh with the teeth of intermediate gear wheel 117. It will be seen that with this arrangement any rotation of the shaft 65 will cause a corresponding rotation of combing wheel 67.

The retarding foot 68 which coöperates with the combing wheel 67, is preferably U-shaped in plan, as clearly illustrated in Fig. 14. Its toes 120 and 121 extend on opposite sides of the combing wheel, and the underside of each is provided with an engaging strip of material which has a high co-efficience of friction, such as rubber. In the present instance these rubber strips, designated 122 and 123, are seated in grooves cut into the under surface of the foot. The foot is also provided with a projection 124 which extends laterally from the toe 121 and is provided with bearings 125 and 126 which are adapted to lie on opposite sides of an apertured boss 127 upon arm 104, and to be secured thereto by a pin 128 which extends through the openings of the bearings 125, 126, and the boss 127. The foot 68 is also provided with a leaf spring 129 which is secured at its forward end to the foot and extends rearward and downward so as to engage the sheets forming the bank of paper, as clearly illustrated in Fig. 4. This spring is positioned and shaped so as to compel the foot 68 to seat itself squarely on the bank.

As shown more particularly in Fig. 4, the cams 86 and 87 are, so to speak, oppositely arranged. In other words, where one is cut away, the other is not. As a result of this, the combing wheel moves downward as the retarding foot moves upward. As illustrated in Fig. 4, the combing wheel is just starting downward and the retarding foot is just about to start upward. To be more accurate it may be stated that preferably the end of the combing action does not come until after the retarding action of the foot has begun; preferably about twenty degrees of rotation of the cam shaft 65 should occur after the beginning of the retarding action, before the end of the combing action.

It is desirable to rock the frame 70 so as to raise and lower the combing wheel and foot together to adjust both as a unit to banks of different thicknesses. To do this the arm 71, which is pivoted upon shaft 65 and carries shaft 69, may be rocked about the shaft 65 by means of the handle 130. Adjacent to the shaft 65, the arm 71 is provided with a downward projection 131 which is provided with an opening through which a threaded pin 132 extends into a threaded opening in side frame 58. By means of a handle 133, the screw 132 may be rotated to clamp the arm 71 in position, or to free the arm 71 for adjustment through manipulations of the handle 130.

In practice after the feathered bank of paper has been placed upon the table 20 and the sheets have been further feathered or combed, through the action of the combing wheel 67, the foremost sheet is engaged by advancing members which move to and fro in timed relation with the movements of the combing wheel and retarding foot. These advancing members are illustrated in a detached view in Fig. 9. They are alike and a description of one will suffice for all. Each comprises an arm 134 secured to an actuating shaft 135 which is operated by a cam 136 mounted upon shaft 88. At the lower end of the arm is a pivoted member 137 which carries at its forward end a pair of loops 138 which form bearings for an axle 139 of a paper engaging roll 140. Besides the loops 138, the member 137 also carries an inclined blade 141 which is secured to the member by a screw and projects beyond it so as to engage the roll 140 whenever the arm 134 moves forward. The blade 141, by engaging the roll 140, prevents its rotation and thereby causes the roll to rub against the paper with sufficient friction to readily carry it along. The bearings formed by the loops 138 allow the axle 139 of the roll 140 to slip forward in them far enough to clear the roll 140 from the blade 141 whenever the arm 134 starts on its backward course. During this movement of the arm, the roll 140 is not frictionally engaged by the blade 141 but is free to revolve and consequently it rolls over the paper on its return movement without carrying it along. In order to free the roll 140 at the end of its forward stroke, the member 137 is provided with an upward projection 142 which is arranged to strike against a shaft 143 which is fixed to the machine at a point near the end of the forward stroke of these advancing members. As clearly shown in Fig. 10, the engagement of the projection 142 with the shaft 143 lifts the roll 140 entirely clear of the paper. In order to force the roll down upon the paper, the member 137 is provided with a rearward projection 144 which is notched on its under side for receiving the end of a coiled spring 145 which is secured at its upper end to a pin 146 on the arm 134. The lower end of the spring 145 may be slipped into different notches so as to vary the pull of the spring and thereby vary the pressure of the roll 140 upon the paper. The shaft 135 has an arm 147 secured to it and at the outer end of this arm is located a cam wheel 148 which bears upon the cam 136 on shaft 88. A coiled spring 149 connects the outer end of the arm 147 with a pin 150 located on the face of the side frame casting 24. This spring serves to hold the wheel 148 in constant engagement with the periphery of the cam 136. From the arrangement of these parts it will be seen that as the shaft 88 rotates, shaft 135 is rocked to and fro and the sheet-advancing members move forward and backward in the direction of travel of the sheets in the forward direction, holding the roll 140 against rotation and advancing the sheets, and in the return direction rolling freely over the sheets. For the purpose of adjusting the arms 134 upon the shaft 135, the boss of each arm is preferably provided with a set screw 151, as illustrated more clearly in Figs. 1, 2 and 4.

After the foremost sheet is advanced by the sheet-advancing member just described, it is brought into a position to be engaged by the drop rolls 152, of which there are preferably two. Each of these rolls is mounted upon a pin 153 which extends laterally from an arm 154 mounted upon a rock shaft 155. This rock shaft is supported by a series of links or hangers 156. The shaft 155 extends through openings in the lower ends of the links 156, and the upper ends of the links are provided with similar openings by which the links are threaded upon a fixed rod or shaft 157 which extends between the side frame castings 23 and 24. Set screws 158 threaded through openings in the bosses of the links 156 serve to secure the links in proper adjusted position upon the shaft 157. The shaft 155 which rests in these hangers or links 156, is rocked to and fro so as to raise and lower the drop rolls 152, through the agency of an arm 159 provided with a cam roller 160 which bears upon the cam 161 upon shaft 88. A compression spring 162 surrounding a rod 163 acts between a projection 167 on the side frame casting 24 and a shoulder 168 on said rod, to force an arm 169 secured to the shaft 155 in a direction to cause the drop rolls 152 to bear with proper tension upon the drum roll and intervening sheet of paper. A set screw 170 threaded through a boss on the arm 169 serves to hold the arm 169 in position upon the shaft 155. With this arrangement it will be seen that as shaft 88 is rotated, shaft 155 is rocked to and fro to raise and lower the drop rolls 152 in timed relation with the sheet-advancing members, the combing wheel and the retarding foot of the machine. By reference to Figs. 5 and 12 it will be seen that one of the drop roll arms 154 is loosely pivoted upon shaft 155 so that it may be adjusted accurately with reference to the other drop roll. The arm so mounted is provided with a forward projection 171 which lies between wings 172 and 173 upon a member 174 which is secured to the shaft 155. An adjusting screw 175 extends through a threaded opening in wing 172 into position to engage one side of the projection 171. A similar screw 176 extends through a similar threaded opening in wing 173 into position to engage the other side of the projection 171. A third screw, designated 177, extends through a slot in the member 174 into threaded engagement with an opening in the projection 171. By loosening up the screws 176 and 177 and tightening up screw 175, the associated drop roll 152 may be lowered. By loosening up screws 175 and 177 and tightening up screw 176, the same roll may be raised. When the roll is properly adjusted all the screws are tightened so as to firmly hold the roll in adjusted position.

The drop rolls 152 coöperate with a drum roller 178 mounted upon shaft 179 which is journaled in bearings in the side frame castings 23 and 24. The roller 178 is positioned so that its upper surface lies slightly above the plane of the upper surface of the table 20. The roller 178 is positively driven and whenever the drop rollers come against a sheet of paper which lies between them and said roller, the sheet of paper is carried forward and delivered from the feeding machine.

Besides the action of the retarding foot 68, the action of the combing wheel 57, the action of the rollers 140 of the sheet-advancing members, and the action of the drum roller 178 and drop rolls 152, all of which have to do with the separation of the foremost sheet of paper from the other sheets of the bank, the bank itself must be moved from time to time, by rotating the shaft 35 which carries the tape rolls 34. As before pointed out, when these tape rolls 34 are rotated, the tapes 37 bodily advance the bank of sheets upon the table 20. According to the present invention this bank of sheets is advanced intermittently and not continuously. The entire bank is advanced only when the thickness of the bank at a definite point falls below a certain amount. When this definite diminution in the thickness of the bank is reached, the shaft 35 is given a definite angular movement to bring about a definite advance of the bank. The mechanism for doing this is somewhat diagrammatically illustrated in perspective in Fig. 8. As there shown, a ratchet wheel 180 is mounted on a stud shaft 181 which is journaled in the side frame casting 24 in line with the shaft 35. This same stud shaft carries a gear wheel 182 which is fixed so as to rotate with the ratchet wheel 180. Gear wheel 182 meshes with gear wheel 183 which is mounted on shaft 184, likewise journaled in side frame casting 24. On the same shaft 184 is a gear wheel 185 which meshes with a gear wheel 186 upon shaft 35. This train of gearing is provided to bring about a proper rotation of the tape wheels 34 in response to each step of the ratchet wheel 180. The latter wheel is given its advance step by means of a pawl 187 which is loosely mounted upon a pin 188 extending laterally from an arm 189 journaled loosely upon the shaft 181. The outer end of the arm 189 is provided with a laterally extending pin 190 and this pin extends through a slot in one end of link 191. A washer 192 and nut 193 upon the pin 190 serve to complete a pin-and-slot connection between the arm 189 and the link 191. The forward end of the link 191 is pivotally connected by a pin 194 to the outer end of a crank 195 which in turn is secured to the outer end of shaft 88. A washer 196 is located between the head of the pin 194 and the adjacent portion of the link 191. With this arrangement it will be seen that as the shaft 88 rotates, the link 191 will be reciprocated to and fro. When the pin 190 is free to move to the right-hand end of the slot, as viewed in Fig. 8, a rotation of the crank 195 will cause a forward rotation of the ratchet wheel 180 one step, which is preferably a distance corresponding to two teeth of the ratchet wheel. Ordinarily the rotation of the crank 195 does not advance the ratchet wheel 180 because of the latch 197 which is loosely pivoted on shaft 143. This latch has a hook at one end which passes over a squared or angular portion of the projecting pin 188 upon which the pawl is journaled. As long as the latch 197 is in engaging position, the arm 189 is held forward and then the pin 190 at the end of the arm rides freely in the slot of the link 191 as the latter reciprocates. The position of the latch 197 is determined by the action of governing mechanism which includes a lever 198 pivoted at 199 to the fixed side of the casting 24. One end of the lever 198 is in position to engage the lower end of a screw 200 which is threaded into an opening in the latch 197 and extends downward so as to be engaged at its lower end by the widened adjacent end of the lever 198. By varying the position of the screw, the point at which the latch 197 will be tripped may be determined. The opposite end of the lever 198 has an engaging end which coöperates with a similar end upon an arm 201 secured to shaft 143 by means of a set screw 202. The shaft 143 is a rock shaft, and the degree to which it may be rocked in one direction is determined by a finger 203 projecting forward from it and fixed to the shaft 143 by a set screw 204. The test finger 203 is limited in its forward movement by an arm 205 journaled upon a stud shaft 206 and carrying a roll 207 at its forward end. The roll 207 rides upon the paper and when the bank is thick occupies a higher position than when the bank is thin. Consequently as the testing finger 203 moves forward it moves until it engages the arm 205, whose position varies in accordance with the thickness of the bank under the roll 207. Cam 208 on shaft 88 coöperates with a cam roller 209 on the end of arm 210 fixed to the rock shaft 143. A coiled spring 211 acts between the end of the arm 210 and a fixed point of the machine, which in the present instance is the transverse rod 157 which carries the hangers 156. The spring 211 tends to carry the arm 210 forward when permitted to do so by the cam 208. This forward movement, however, may be limited at the time the cut-away portion of the cam 208 is passing the cam roller 209, by the engagement of test finger 203 with the arm 205 of the governor roller 207. As soon, however, as the more protruding portion of the cam 208 engages the cam roller 209, the shaft 143 will be rocked to its full limit in the opposite direction. This to-and-fro rocking of the shaft 143 rocks the arm 201. Through the agency of lever 198 and adjusting screw 200, latch 197 is raised so as to clear the angular end of the pin 188 whenever the test finger moves beyond a given point. As we have seen, this critical point is determined by the thickness of the bank under the governor roll 207. When the latch 197 is thus raised to clear the arm 189, it will be free to drop under the action of gravity far enough for the pawl 187 to pass over two teeth and then, as the crank 195 rotates, the rear end of the slot in link 191 will engage pin 190 and carry the arm 189 forward with a corresponding movement of the ratchet wheel 180 and the gear train connected with it. This will result in rotating the tape rollers 34 and carrying the tapes 37 forward a given distance and thereby moving the entire bank of sheets forward the same distance. When this is done, the governor roller 207 will rise and arm 205 will then limit the next stroke of the test finger 203 so that the latch 197 will be free to engage the angular portion of the pin 188 and hold the pawl from dropping back to make a second advance of the ratchet wheel 180. However, when the sheets upon the pile have been removed so that the thickness under the governor roll 207 again reaches the critical point, the pawl 187 will be again freed and drop back to take a hold upon the ratchet wheel 180, with the same result as heretofore described.

It will be seen that the position of the crank 195 upon shaft 88 should be accurately established with reference to the cam 208 and when so established the crank may be held in position by a set screw 212. It may here be pointed out also that the rock shaft 143 extends through bearings formed upon rearward extensions 213 of the hangers 156. At one end the shaft 143 does not extend beyond the bearing formed in the hanger 156 which is adjacent to the guard 43. At the other end, however, the shaft 143 extends through a bearing formed in the side frame casting 24 and extends far enough beyond it to provide for the mounting of latch 197 and arm 201. At this point attention is also called to the fact that the stud shaft 206 upon which the governor arm 205 is journaled extends from the lateral projection 213 of the hanger 156 which is nearest to the center of the table 20. This is clearly illustrated in Fig. 8 in perspective and also in plan in Fig. 1.

In the present instance the various parts of the feeding machine are driven from a drive wheel 214 upon a folder 215. The drive wheel 214 communicates its motion through a train of gearing including the gear wheels 216, 217, 218 and 219. The latter wheel is located on the spindle 179 of the drum roller 178. Incidentally in the present instance the gear wheel 217 drives the roller 220 of the folding machine. The latter drives tapes 221 and these tapes coöperate with drop rolls 222, carried by arms 223 mounted upon a transverse rod 224. The frame of the folder and the side frame castings 23 and 24 of the feeding machine are connected by straps 225 and 226 so as to hold the two machines rigidly together. It will be understood, however, that the folding machine forms no part of the present invention but merely illustrates how a folding machine may be associated with my feeding machine and, when so associated, how the latter may be driven from the drive wheel of the folder. Obviously the roller 178 of the feeding machine might be driven in any other desired way.

The rotation which is communicated by gear wheel 219 to the drum roller 178, is communicated by the latter, through a pinion 227 located on its spindle 179, to a gear wheel 228 mounted to rotate freely on a stud 155$^a$ projecting from the side frame casting 23. The gear wheel 228 is coupled to rotate with a small gear wheel 229 and the latter is in mesh with a gear wheel 230 mounted to rotate freely upon the end of shaft 88. Gear wheel 230 coöperates with a disk 231 which is fixed upon shaft 88 by a pin 232. The disk 231 has an inwardly extending pivot 233 upon which a curved clutch hook 234 is mounted. This clutch hook is normally held by a spring 235 against a stop pin 236, which limits its movement. When the clutch hook 234 is in engagement with stop pin 236, then it establishes clutching engagement with the clutch pin 237 upon the gear wheel 230. The clutching position of the parts is illustrated in Fig. 6. As clearly shown, the pivot 233, clutch hook 234, spring 235 and stop pin 236, are all connected with the disk 231. The clutch pin 237, on the other hand, is located upon the gear wheel 230. When it is desired to throw the clutch hook 234 out of clutching position, the lever 238 is moved from the full line position of Fig. 6 to the dotted line position. In this latter position the anti-friction roller 239 upon the lateral projection 240 of the lever engages the portion of the hook 234 adjacent to spring 235 and throws the distant end of the clutch hook out of the path of movement of the clutch pin 237 and thereby allows the gear wheel 230 to continue its motion without transmitting the same to the disk 231 and its shaft 88. The lever 238 is secured at its lower end to a rock shaft 241 which extends crosswise of the machine and is journaled in bearings in the side frame castings 23 and 24. A similar lever 242 is fixed to the same shaft 241, and a rod 243 is secured to it and extends laterally from it along the side of the folding machine so as to be readily grasped by the operator for the purpose of actuating the clutch whenever he so desires. The end of the rod 243 distant from the lever 242 may be supported in any desired way.

From the train of gearing thus far traced, it will be seen that the shaft 88, which is the cam shaft at the forward or delivery end of the machine, may be set rotating by a simple manipulation of the clutch mechanism, whereas the drum roller 178 is rotating at all times. In order to communicate rotation to the cam shaft 65 of the combing wheel 70 and retarding foot mechanism, shaft 88 is provided with a bevel gear wheel 244 which is secured to it and arranged to mesh with a similar bevel gear wheel 245 on the end of longitudinal shaft 62. Thus the rotation of shaft 88 is communicated to shaft 62 and, as before explained, the rotation of the latter is communicated to shaft 65 through the miter gears 63, 64.

In order to restrain the rotation of shaft 88 and thus prevent it from racing or overrunning, I provide a strap brake mechanism, preferably of the type illustrated more particularly in Fig. 5. This mechanism includes a flexible metal strap 246 which is secured at one end of a yoke 247 in any suitable way, as by screws 248, and extends around a spool or pulley 249 fixed to shaft 88 and terminates in a threaded rod 250 which passes through an opening in yoke 247 and is provided with a thumb nut 251 by which it may be drawn up or loosened upon the spool 249. To increase the friction between the spool and the strap, I preferably place a strip of leather 252 upon the inner face of the strap so as to engage the surface of the spool 249. By turning the nut 251, the braking effect may be varied as desired.

With reference to the clutch-operating levers 238 and 242, it may be pointed out that they are limited in their to-and-fro movement by stops upon a sector plate 253 which is secured to shaft 241 by a set screw 254. The stops on the plate 253 engage opposite sides of the rod 157, one stop engaging one side in one position of the clutch levers, and the other stop engaging the other side in the other position of the same levers.

From the description thus far given, it will be seen that the bank of sheets is to be feathered by hand when placed upon the feed table, and that when the machine is set going, the combing wheel 67 acts upon the bank so as to still further feather the uppermost sheets, this being done principally while the retarding foot 68 is lifted. Then when the combing wheel has completed its operation, the retarding foot again engages the bank and engages the foremost sheet as well as others. Then the advancing members come into play and the rolls 140 are pressed into engagement with the top sheet and, by their action, carry it forward, freeing its rear edge from the retarding foot 68. Following the forward movement of the sheet in response to the advancing members, the sheet is engaged by the drop rolls 152 and the drum roll 178 and finally delivered from the feeding machine. At the time the sheet advancing members are returning, the governor mechanism operates to test the thickness of the bank and if the same is below the critical point, causes the tapes 37 to bodily move forward the entire bank through a given distance. At the time the governing mechanism brings about a bodily advance of the bank of sheets, the retarding foot 68 is lifted. This advance by the governing mechanism, however, does not interfere with the action of the combing wheel 67 and the latter continues its combing action even though the tapes 37 be advancing the bank of sheets. These various relations of the mechanisms of the machine are determined largely by the positions and shapes of the cams upon the cam shafts 65 and 88. These of course may be varied somewhat, as experience and judgment of the instructor may dictate. Attention is called to the fact that in the mechanism herein disclosed the combing action takes place at the rear end of the uppermost sheets of the bank. This position of the combing wheel enables the combing action to be applied to the second sheet just as soon as the first has been moved out of the way by the sheet-advancing members which are located near the forward end of the topmost sheet. Besides giving more time for the combing than would be possible if the combing wheel were positioned farther forward with reference to the uppermost sheet, the location of the combing wheel and retarding foot herein disclosed enables the machine to be used with much smaller sheets than would otherwise be possible.

What I claim as new and desire to secure by Letters Patent of the United States is:

1. A sheet feeding machine including a feed table adapted to hold a bank of sheets, a combing wheel for combing out the sheets, a foot for engaging the bank of sheets, advancing means for engaging the foremost sheet to advance it, said means having a to-and-fro movement in the general direction of travel of the sheets, and mechanism for operating said wheel, foot and means in timed relation so as first to comb out the sheets and then advance the foremost sheet while holding the bank.

2. A sheet feeding machine including a feed table adapted to hold a feathered bank of sheets, a combing wheel for combing out the sheets as they are fed along said table, a foot for engaging said bank of sheets, advancing members for engaging the foremost sheet to advance it, said members having a forward and backward movement, and mechanism for raising and lowering said wheel and foot alternately and for moving said advancing members forward at the time said wheel is elevated and said foot is resting on the bank of sheets.

3. In a sheet feeding machine, the combination of a feed table, a pair of transverse shafts positioned above said table, one of said shafts being rotatable and the other fixed, a sleeve on said rotatable shaft, a frame mounted upon said sleeve and fixed shaft, an arm loosely mounted on said sleeve, a combing wheel journaled near the free end of said arm, means for rocking said arm to raise and lower said combing wheel relative to said table, a train of gear wheels movable with said arm including a gear wheel fixed to said sleeve and a gear wheel rotatable with said combing wheel, a set screw in said sleeve adapted to engage said rotatable shaft, whereby upon loosening said screw, said frame and sleeve, together with the parts carried by them, may be adjusted along said shafts and upon tightening said screw, said sleeve and the parts fixed upon it may be rotated with said rotatable shaft.

4. In a sheet feeding machine, the combination with a feed table and combing wheel, of a support for said wheel comprising two shafts extending transversely of and above said table, a sleeve on one of said shafts, a frame mounted on said sleeve and said other shaft and movable with said sleeve along said shafts, a supporting arm for said combing wheel carried loosely upon said sleeve, a train of gear wheels for driving said combing wheel including a gear wheel fixed to said sleeve, and means for adjustably securing said sleeve to its said shaft, whereby said combing wheel may be adjusted laterally of said table and driven from said shaft.

5. In a sheet feeding machine, the combination of a feed table, conveying tapes for bodily advancing the bank of sheets upon said table, driving mechanism for said tapes, means for governing the operation of said driving mechanism in response to a given diminution of the thickness of the bank of paper at a given location, a cam shaft for operating said governing means, a second cam shaft geared to said first mentioned cam shaft and extending transversely of and above said table, a sleeve on said second shaft, a cam on said sleeve, an arm journaled upon said sleeve, a combing wheel carried by said arm, means coöperating with said cam to raise and lower said combing wheel, and a set screw for securing said sleeve to said second cam shaft, said set screw being seated in a longitudinal groove in said second cam shaft, so as to allow the sleeve and associated parts to be set in different positions along said second cam shaft and at the same time obtain for each setting the correct relation between the cams on the two cam shafts.

6. In a sheet feeding machine, the combination with a feed table, combing wheel and combing wheel actuating mechanism, of a retarding foot having toes extending on opposite sides of the plane of the combing wheel for engagement with the paper on the table, and means for elevating and depressing said foot in timed relation with the movements of said combing wheel.

7. In a sheet feeding machine, the combination with a feed table, of a combing wheel, a rock arm for supporting said combing wheel, a lifting arm for raising the free end of said rock arm to raise said combing wheel, a cam for actuating said lifting arm, a retarding foot having a plurality of forwardly extending toes, and similar rock and lifting arms and a cam for said foot for raising and lowering it in timed relation to the raising and lowering of said combing wheel, said foot extending laterally from the plane of its rock and lifting arms so as to bring one of its toes on one side of the plane of said wheel and another toe on the other side of said plane.

8. In a sheet feeding machine, the combination with the feed table and combing wheel, of a shaft extending transversely of said table, an arm pivoted freely on said shaft and carrying said combing wheel near its outer end, a train of gear wheels for driving said combing wheel from said shaft, certain of said wheels being carried by said arm, a cam on said shaft, a pivoted arm actuated to and fro by said cam, and a link connecting the free ends of said arms, whereby said combing wheel is raised and lowered relative to said table as said shaft rotates.

9. A sheet feeding machine including a feed table adapted to hold a bank of sheets, a combing wheel for combing out the sheets, a foot for engaging the bank of sheets, means movable to and fro in the general direction of travel of the sheets to engage the foremost sheet and to advance it from engagement with said foot, and mechanism for operating said wheel, foot and means in timed relation so as first to comb out the sheets and then advance the foremost sheet while holding the bank.

10. A sheet feeding machine including a feed table adapted to hold a feathered bank of sheets, a combing wheel for combing out the sheets as they are fed along said table, a foot for engaging said bank of sheets, advancing members having a forward and backward movement operative to engage the foremost sheet and to advance it from engagement with said foot, and mechanism for raising and lowering said wheel and foot alternately and for moving said advancing members forward at the time said wheel is elevated and said foot is resting on the bank of sheets.

11. A sheet feeding machine including a feed table adapted to hold a bank of sheets, a combing wheel for combing out the sheets, a foot for engaging the bank of sheets, advancing members for engaging the foremost sheet to advance it, rolls for engaging the sheet delivered by said members and operative to still further advance it, and mechanism for operating said wheel, foot, members and rolls in timed relation.

12. A sheet feeding machine including a feed table adapted to hold a bank of sheets, a combing wheel for combing out the sheets, a foot for engaging the bank of sheets, advancing members for engaging the foremost sheet to advance it, coöperating drum and drop rolls for engaging the sheet delivered by said members and operative to still further advance it, and mechanism for operating said wheel, foot, members and rolls in timed relation.

13. A sheet feeding machine including a feed table adapted to hold a feathered bank of sheets, a combing wheel for combing out the sheets as they are fed along said table, a foot for engaging said bank of sheets, advancing members movable forward and back and operative on their forward stroke to engage the foremost sheet to advance it, rolls for engaging the sheet delivered by said members and operative to still further advance said sheet, and mechanism for raising and lowering said wheel and foot in timed relation, for moving said advancing members forward at the time said wheel is raised and said foot is resting on the bank of sheets, and for subsequently bringing said rolls into action.

14. A sheet feeding machine including a feed table adapted to hold a feathered bank of sheets, a combing wheel for combing out the sheets as they are fed along said table, a foot for engaging said bank of sheets, advancing members movable forward and back and operative on their forward stroke to engage the foremost sheet to advance it, coöperating drum and drop rolls for engaging the sheet delivered by said members and operative to still further advance said sheet, and mechanism for raising and lowering said wheel and foot in timed relation, for moving said advancing members forward at the time said wheel is raised and said foot is resting on the bank of sheets, and for subsequently bringing said rolls into action.

15. A sheet feeding machine including a feed table adapted to hold a feathered bank of sheets, means for feeding the bank intermittently, a combing wheel and retarding foot positioned above the bank so as to act upon the rear end of the uppermost sheets, advancing members for engaging the foremost sheet near its forward end to advance it after it has been subjected to the action of the combing wheel, and mechanism for operating said intermittent feeding means, said wheel, foot and members in timed relation, 16. A sheet feeding machine including a feed table adapted to hold a feathered bank of sheets, a combing wheel and retarding foot positioned above the bank so as to act upon the rear end of the uppermost sheets, advancing members for engaging the foremost sheet near its forward end to advance it after it has been subjected to the action of the combing wheel, and mechanism for operating said wheel, foot and members in timed relation.

In testimony whereof, I have hereunto subscribed my name this 20th day of September, A. D. 1917.

WILLIAM M. McCAIN.